United States Patent [19]

Bodor et al.

[11] Patent Number: 5,436,021
[45] Date of Patent: Jul. 25, 1995

[54] PUMPABLE OLEAGINOUS COMPOSITIONS

[75] Inventors: Janos Bodor, Rijswijk, Netherlands; Girish N. Desai, Ellicott City, Md.; Thomas Wajda, Vlaardingen, Netherlands

[73] Assignee: Van den Bergh Co., Division of Conopco, Inc., Lisle, Ill.

[21] Appl. No.: 6,886

[22] Filed: Jan. 21, 1993

Related U.S. Application Data

[63] Continuation-in-part of Ser. No. 999,024, Dec. 31, 1992, abandoned.

[51] Int. Cl.6 ............................................. A23D 9/02
[52] U.S. Cl. ................................. 426/606; 426/607
[58] Field of Search ............. 426/601, 603, 606, 607, 426/524, 581, 530

[56] References Cited

U.S. PATENT DOCUMENTS

| | | | |
|---|---|---|---|
| 2,521,242 | 9/1950 | Mitchell, Jr. | |
| 2,815,285 | 12/1957 | Holman et al. | |
| 2,815,286 | 12/1957 | Andre et al. | |
| 2,846,312 | 8/1958 | Lantz et al. | |
| 2,999,022 | 9/1961 | Payne et al. | |
| 3,047,402 | 7/1962 | Schmidt | |
| 3,395,023 | 7/1968 | Haighton et al. | |
| 3,455,699 | 7/1969 | Bell et al. | |
| 3,528,823 | 9/1970 | Rossen | |
| 3,914,452 | 10/1975 | Norris | |
| 3,914,453 | 10/1975 | Gawrilow | |
| 3,943,259 | 3/1976 | Norris | |
| 4,087,565 | 5/1978 | Ebskamp | 426/603 |
| 4,137,338 | 1/1979 | Gawrilow | |
| 4,226,894 | 10/1980 | Gawriflow | |
| 4,234,606 | 11/1980 | Gawrilow | |
| 4,335,157 | 6/1982 | Varvil | |
| 4,359,482 | 11/1982 | Crosby | |
| 4,362,758 | 12/1982 | MacNeill | 426/603 |
| 4,391,838 | 7/1983 | Pate | |
| 4,469,710 | 9/1984 | Rielley et al. | |
| 4,568,556 | 2/1986 | McCoy | 426/603 |
| 4,824,684 | 4/1989 | Barry et al. | |
| 4,889,740 | 12/1989 | Price | |
| 4,910,037 | 3/1990 | Sagi | 426/607 |
| 4,948,618 | 8/1990 | Hirokawa | 426/606 |
| 5,023,101 | 6/1991 | Sugihara | 426/607 |
| 5,038,572 | 8/1991 | De Bruijne | 426/524 |
| 5,169,668 | 12/1992 | Milo | 426/603 |
| 5,185,173 | 2/1993 | Bethke et al. | |

FOREIGN PATENT DOCUMENTS

| | | |
|---|---|---|
| 0421510 | 4/1991 | European Pat. Off. |
| 760084268 | 7/1976 | Japan |
| 1025992 | 4/1966 | United Kingdom |
| 1245489 | 9/1971 | United Kingdom |
| 1382214 | 1/1975 | United Kingdom |
| 1516374 | 7/1978 | United Kingdom |
| 1064335 | 4/1987 | United Kingdom |

Primary Examiner—Carolyn Paden
Attorney, Agent, or Firm—Gerard J. McGowan, Jr.

[57] ABSTRACT

Fat products provided in liquid pumpable form such as shortening, margarine and other bread spreads, while still maintaining relatively high solid fat content (N20=12-22). The products are made by cooling the fat composition to the alpha crystallization temperature and seeding it with matured crystals of the same fat composition. Subsequently, the product is matured, by stirring for a period of time which may be 20 hours or so. The product of the invention can stay pumpable without further stirring for extended periods of time, such as five weeks, or more.

4 Claims, No Drawings

PUMPABLE OLEAGINOUS COMPOSITIONS

This is a continuation-in-part of U.S. Ser. No. 07/999024 filed Dec. 31, 1992, now abandoned

BACKGROUND OF THE INVENTION

Industrial shortenings are often marketed in either plasticized solid or molten liquid form. For most application the plasticized form is required, though packaging is costly for the manufacturer and unpacking at the user presents labor cost and packaging material disposal problems. Consequently, it is advantageous in certain cases to provide a shortening or other oleaginous material in a pumpable form.

Various pumpable shortening compositions and processes for their preparation and use have been disclosed. Many of these are shortenings having relatively low solids contents. It is desirable in many applications, however, that the solids content be relatively high.

GB 1382214 discloses fluid shortenings said to have a relatively high percentage of hardstock and which do not require a time-consuming Beta to Beta conversion step. The shortening is prepared by splitting the hardstock from the emulsifier initially and later combining them.

Mitchell U.S. Patent No. 2,521,242 discloses an oleaginous suspension said to be permanently pumpable and which contains as much as 60% solid triglyceride. The product is made so as to ensure that solid triglyceride crystallizes in the B crystal form. It is mentioned that seed crystals may be used.

Lantz et al. U.S. Pat. No. 2,846,312 is directed to semi-plastic or rigid solid shortenings treated to become and remain fluid at room temperature. The shortenings are plasticized as by running through a chilled agitator unit, and then passed to an agitating vessel where at room temperature the plastic mass is stirred or otherwise agitated for a period 2 days. The mass is said to remain fluid indefinitely. In Example 1, a batch of emulsified shortening comprising 30% normally solid triglyceride fat and 70% normally liquid triglyceride oil was used.

Payne et al. U.S. Pat. No. 2,999,022 discloses a process for preparing a liquid shortening comprising heating oil containing solid fats to a temperature high enough to melt all of the solids, cooling to a temperature just above the alpha melting point of the fat and holding there for a length of time for small beta-prime crystalline growth, heating to a temperature a few degrees above the beta prime melting point to convert the beta prime crystals to beta crystals and cooling slowly to below the alpha melting point. The necessary agitation is described.

Rossen U.S. Pat. No. 3,528,823 discloses a fluid shortening having the following solid fat index values: 15-25 at 0° C., 7-15 at 21.1° C., 4-12 at 33.3° C. and 3-12 at 42.0° C.

SUMMARY OF THE INVENTION

We have discovered that fat products can be provided in liquid pumpable form such as shortening, margarine and other bread spreads, while still maintaining relatively high solid fat content (N20=12-22). The product of the invention is made by cooling the fat composition to the alpha crystallization temperature and seeding it with stabilized, matured crystals of the same fat composition or with the same fat which was previously crystallized. Subsequently, the product is matured, by stirring for a period of time which may be 20 hours or so. The product of the invention can stay pumpable without further stirring for extended periods of time, such as five weeks, or more. The invention is also directed to a shortening having a relatively high solid fat content, e.g., N20=12-22, preferably N20=16-19.

DETAILED DESCRIPTION OF THE INVENTION

The fat-containing product is preferably suitable for use as a shortening, but may also be a margarine, bread spread or other fat-containing composition.

The fat-containing product preferably includes a relatively high solid fat content, e.g., N20=12-22, preferably N20=16-19. The N-value is measured by the nuclear magnetic relaxation technique and is a direct measure of the level of solid fat content at a given temperature. An appropriate procedure is described in Fette, Seifen, Anstrichmittel 80(5), 180-186 (1978).

It is preferred that the fat used be triglyceride fat derived from vegetable sources including soybean, corn, sunflower, palm, palmkernal, rapeseed, coconut, safflower, cottonseed, peanut and olive oils. Other digestible fat sources which may be used are fish oil, milk fat, butterfat, lard and tallow. The oil will be hardened by hydrogenation if that is necessary to achieve the desired melting characteristics. Also, fractionation and interesterification may be used to obtain fats of the desired melting range.

A preferred fat is a hydrogenated mixture of soybean and cottonseed oils (94:6) having the following characteristics.

TABLE 1

| N Value at | SFI at |
| --- | --- |
| 10° C. 35-39 | 10.0° C. 23-24 |
| 20° C. 16-19 | 21.2° C. 14-15 |
| 30° C. 10-14 | 33.3° C. 10-11 |
| 35° C. 5-6 | 40.0° C. 7-9 |

Melting Point: 47.3° C.
Iodine Value: 83.1

Non-digestible fats may also be used as the fat source. Among the non-digestible fats are included polyol polyesters of C8 to C22 fatty acids such as sucrose polyester, sucrose polyethers, silicone oils/siloxanes, polycarboxylic acid esters, branched chain fatty acid triglycerides, neopentyl alcohol esters, dicarboxylic acid esters, jojoba oil and triglycerol ethers. Non-digestible fats may be used as from 0 to 100% of the fat, especially from 10 to 90%, and most especially from 25 to 75%.

In a preferred process, the fat composition is chilled to the alpha crystallization point in a Votator(R) A-unit, which is a scraped surface heat exchanger. Immediately after it leaves the A-unit, the composition is seeded by injecting it with a small percentage of previously matured, softened shortening of the same temperature. The two streams are then mixed in a votator C-unit and matured in a stirred tank for up to 24 hours.

The percentage of crystallized fat which is used as a seed may vary from 0.1 to 10% by weight, preferably from 2 to 8 %, especially from 3 to 5%.

Subsequent to maturing, the fat product may be aerated, if desired.

Emulsifiers may be included in the fat product. Emulsifier may be included at a level of from 0 to 30% by weight, especially from 2-10% and particularly from 0.05 to 2% by weight, often not more than 1% by weight. However, the emulsifier level will depend upon the desired application, such as whether the end product is to be, e.g., a bread, a cake or a cookie. Suitable emulsifiers include lecithin, mono- and diglycerides, partial polyglycerol esters, diacetyl tartaric acid esters of mono- and diglycerides, sorbitan polyoxytheylene fatty acid esters (polysorbates), acetic, citric and lactic acid esters of mono- and diglycerides, polyethylene glycol fatty acid esters, polyglycerol fatty acid esters, sorbitan fatty acid esters, lactylic esters of fatty acids and their salts (Na and Ca), stearoyl lactylated, Ca and Na salts, ethoxylated monoglycerides, hydroxylated lecithin, succinylated monoglycerides, acetylated monoglycerides, succistearin and citric acid esters of mono and diglycerides and sucrose esters of fatty acids and sucroglycerides. Advantageous emulsifiers include polyoxyethylene sorbitan monoesters such as TWEEN 60 and TWEEN 80, and a polyglycerol polyricinoleate sold under the name Admul Wol available from Quest International, Naarden, the Netherlands.

Where the fat composition is to be used in or as a margarine or bread spread, optional ingredients include emulsifiers, salt (particularly sodium chloride), preservatives, flavors, protein, vitamins, especially fat soluble vitamins such as Vitamin A, antioxidants, antimicrobials, and preservatives, including citric and other acids. Coloring agents, such as beta carotene, paprika, turmeric and annatto may be employed. In addition to sodium chloride, flavor enhancers which may be employed include lactones, lipolyzed butter oils and starter distillates, diacetyl, 2-octanone, butyric acid, hexanoic acid, and other fatty acids, esters of butyric acid, delta-hydroxy acids and their glycerol esters and mixtures thereof.

The proteins used in the spreads can conveniently be in the form of milk protein from whole, skim or other low fat milk and may comprise whey proteins (with or without lactose), acid casein and caseinates. Vegetable protein, such as soy protein, peanut protein, cottonseed protein, and the like may also be used.

Preservatives, such as benzoic acid, sorbic acid, phosphoric acid, lactic acid, acetic acid, hydrochloric acid and the soluble salts thereof may be used. Likewise, the fat-containing composition may include antimicrobials such as potassium sorbate, sodium sorbate, potassium benzoate, sodium benzoate and phosphoric acid.

Antioxidants may include normal propyl gallate, the tocopherols, including Vitamin E, butylated hydroxyanisole (BHA), butylated hydroxytoluene (BHT), nordihydroguaiaretic acid (NDGA), tertiary-butylhydroquinon (TBQH) and citric acid.

Preferably the compositions prepared by the composition of the invention have a hardness (C-value) of less than 60, preferably less than 40 after three weeks of storage. More preferred are compositions prepared by the process having a C-value of less than 60 after five weeks of storage.

Example 1

Two processing methods were compared using the hydrogenated soy/cottonseed oil blend of Table 1 above. In part a), a conventional approach was employed, whereas in part b) a process according to the invention was utilized.

a) Conventional Process

The soy/cottonseed blend of Table 1 was melted in a tank and maintained at 135°–140° F. A pump speed was set at 200lb/hr. An A-unit was set at 800 RPM and had a cooling surface of 0.78 Sq. ft. The blend was votated in an A-unit where its temperature was brought to below the alpha crystallization temperature and exited at 16°–17° C. The cooled blend was then pumped into a C-unit where it was kept at a temperature of 78°–80° F. It then matured in a stirred tank for 24 hours.

b) Process of the Invention

The fat blend of Table 1 was chilled to the alpha crystallization temperature using an A-unit, exiting at 20° C. After exiting the A-unit a stream comprising a previously crystallized (previously votated in an A-unit and mixed at 74° F.) portion of the same fat composition was injected. The cooled fat composition was pumped into a C-unit and held at 86°–88° F.

The following variables were studied:
1) Effect of Conventional versus seeding method on the hardness of the shortening
2) Effect of maturing time
3) Effect of different amounts of seeding.

The hardness values for the conventional and seeded compositions are given in Table 2. Compositions with a C-value of 60 were considered to be too hard to be pumpable. It can be seen in Table 2 that after 6 days shortening seeded in accordance with the present process has a much lower hardness (better pumpability) than shortening prepared by conventional means.

TABLE 2

Hardness Conventional Vs. Seeding Method
C— Values (g/cm$^2$)

| | Conventional A-C Mixing tank | | | 5% Seeding A-C Mixing tank | | |
|---|---|---|---|---|---|---|
| | Mixing time in tank . . . | | | | | |
| DAY | 2 hrs. | 20 hrs. | 24 hrs. | 2 hrs. | 20 hrs. | 24 hrs. |
| 0 | <25 | <25 | <25 | <25 | <25 | <25 |
| 1 | 150 | 50 | 50 | 55 | <25 | <25 |
| 2 | 300 | 100 | 90 | 61 | 25 | 25 |
| 3 | 350 | 180 | 170 | 95 | 38 | 25 |
| 4 | 350 | 240 | 190 | 110 | 35 | 29 |
| 5 | 380 | 212 | 213 | 117 | 35 | 27 |
| 6 | 420 | 208 | 230 | 132 | 37 | 33 |

Example 2

Example 1 was repeated with seeding levels of 2%, 5% and 8.5% by weight. The seeding percentage calculation is as follows. The flow rate for the main stream is determined first by weighing the product for a fixed time and then the amount of seed required is calculated from that and the feed rate for seed is set based on this calculated information. For example, if the main flow rate is 300 lb/hr. then at the 5% seeding level, the seed feed rate will be 15 lb/hr.

TABLE 3

Effect of seeding amount on hardness C-value (g/cm$^2$)

| | DAYS | | | | |
|---|---|---|---|---|---|
| | 1 | 2 | 3 | 4 | 7 |
| 2% Seeding: 0 hr. mixing | 77 | 177 | 281 | 243 | 323 |
| 5% Seeding 0 hr. mixing | 111 | 183 | 230 | 290 | 447 |
| 8.5% Seeding 0 hr. mixing | 105 | 150 | 197 | 270 | 428 |

While not wishing to be limited by the scientific theory of the invention, it is believed that a general explanation is as follows. In a fat, a great many crystals lie close to each other, forming a chain of crystals (network). Shearing action can destroy the network and the fat becomes softer. The bonds that are broken are secondary bonds, which are weak and reversible. The crystals may also intergrow, forming a strong bond, which breaks when shearing action is applied but does not recover. These are primary bonds and they are very strong and irreversible. In the present pumpable process the network is formed in such a way that the fat is stabilized.

What is claimed is:

1. A process for preparing a pumpable fat-containing shortening product comprising
   a) chilling a fat-containing composition having an N20 value of from 12 to 22 to at or below its alpha crystallization point,
   b) injecting into the chilled composition a stream of the fat-containing composition which has previously been crystallized and matured, and
   c) mixing the composition thus obtained whereby a pumpable shortening having an N20 value of from 12 to 22 is obtained.

2. The process of claim 1 wherein the chilled fat-containing composition is chilled in a chilling apparatus, is fed from said chilling apparatus in a stream and wherein said stream of crystallized fat-containing composition is fed into said stream of chilled product.

3. The process according to claim 1 wherein the fat-containing composition is a hydrogenated blend of soybean and cottonseed oils.

4. The process according to claim 1 wherein the fat-containing composition is chilled in an A-unit.

* * * * *